(12) United States Patent
Pupeza et al.

(10) Patent No.: US 9,625,728 B2
(45) Date of Patent: Apr. 18, 2017

(54) SPATIALLY SPLITTING OR COMBINING RADIATION BEAMS

(75) Inventors: Ioachim Pupeza, Munich (DE); Ferenc Krausz, Garching (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 274 days.

(21) Appl. No.: 13/981,730

(22) PCT Filed: Jan. 25, 2012

(86) PCT No.: PCT/EP2012/000342
§ 371 (c)(1),
(2), (4) Date: Oct. 11, 2013

(87) PCT Pub. No.: WO2012/100943
PCT Pub. Date: Aug. 2, 2012

(65) Prior Publication Data
US 2014/0029107 A1    Jan. 30, 2014

(30) Foreign Application Priority Data
Jan. 26, 2011 (EP) .................... 11000626

(51) Int. Cl.
*G02B 27/00* (2006.01)
*G02B 27/14* (2006.01)
*G02B 5/30* (2006.01)

(52) U.S. Cl.
CPC ......... *G02B 27/141* (2013.01); *G02B 5/3066* (2013.01)

(58) Field of Classification Search
CPC ...... G02B 5/3066; G02B 5/3075; G02B 5/04; G02B 27/14; G02B 27/141–27/149;
(Continued)

(56) References Cited

U.S. PATENT DOCUMENTS

| | | | |
|---|---|---|---|
| 5,225,893 A | * | 7/1993 | Whitney et al. ............... 356/407 |
| 5,943,136 A | * | 8/1999 | Pipino et al. ................. 356/440 |

(Continued)

FOREIGN PATENT DOCUMENTS

| | | |
|---|---|---|
| GB | 2286694 A | 8/1995 |
| WO | 02068999 A2 | 9/2002 |

(Continued)

OTHER PUBLICATIONS

Eidam et al., "Femtosecond fiber CPA system emitting 830 W average output power", Optics Letters, vol. 35. No. 2, pp. 94-96 (2010).

(Continued)

*Primary Examiner* — Scott J Sugarman
*Assistant Examiner* — Gary O'Neill
(74) *Attorney, Agent, or Firm* — Caesar Rivise, PC

(57) ABSTRACT

A method of spatially splitting a primary radiation beam (1) with a first radiation component (2) including an optical wavelength and a second radiation component (3) having a wavelength shorter than the first radiation component wavelength, said second radiation component (3) having a second or higher harmonic wavelength relative to the optical wavelength, comprises directing the primary radiation beam (1) onto a deflection mirror (10) having a reflective mirror surface (12) and carrying a refractive plate element (20), reflecting the first radiation component (2) at the reflective mirror surface (12) and reflecting the second radiation component (3) at an exposed plate surface (22) of the refractive plate element (20), wherein the reflected radiation components (4, 5) travel along different beam paths. Furthermore, a method of spatially combining a first beam path of a first radiation component (2) and a second beam path of a second radiation component (3) is described, wherein the beam splitting method is reversed. Further more, an optical (Continued)

device for implementing the above methods and applications of the methods are described.

16 Claims, 5 Drawing Sheets

(58) Field of Classification Search
CPC .... G02B 27/10; G02B 27/1006; G02B 27/12; G02B 27/123; G02B 27/126; G02B 27/283; G02B 27/285; G02B 27/1013
USPC .................................................. 359/618–640
See application file for complete search history.

(56) References Cited

U.S. PATENT DOCUMENTS

| | | | |
|---|---|---|---|
| 2004/0085661 A1* | 5/2004 | Tempea et al. | 359/883 |
| 2006/0221336 A1 | 10/2006 | Boege | |
| 2006/0268949 A1 | 11/2006 | Gohle et al. | |

FOREIGN PATENT DOCUMENTS

| | | |
|---|---|---|
| WO | 2011060805 A1 | 5/2011 |
| WO | 2012031607 A1 | 3/2012 |

OTHER PUBLICATIONS

Gohle et al., "A frequency comb in the extreme ultraviolet", Nature, vol. 436, pp. 234-237 (2005).
Hartl et al., "Cavity-enhanced similariton Yb-fiber laser frequency comb: 3×10 14 W/cm2 peak intensity at 136 MHz", Optics Letters, vol. 32, No. 19, pp. 2870-2872 (2007).
Jones et al., "Phase-Coherent Frequency Combs in the Vacuum Ultraviolet via High-Harmonic Generation inside a Femtosecond Enhancement Cavity", PRL, vol. 94, pp. 19320-1-4 (2005).
Moll et al., "Output coupling methods for cavity-based high-harmonic generation", Optics Express, vol. 14, No. 18, pp. 8189-8197 (2006).
Ozawa et al., "High Harmonic Frequency Combs for High Resolution Spectroscopy", PRL, vol. 100, pp. 253901-1-4 (2008).
Pupeza et al., "Highly sensitive dispersion measurement of a high-power passive optical resonator using spatial-spectral interferometry", Optics Express, vol. 18, No. 25, pp. 26184-26195.
Pupeza et al., "Power scaling of a high-repetition-rate enhancement cavity", Optics Letters, vol. 35, No. 12, pp. 2052-2054 (2010).
Rempe et al., "Measurement of ultralow losses in an optical interferometer", Optics Letters, vol. 17, No. 5, pp. 363-365 (1992).
Russbueldt et al., "400 W Yb:YAG Innoslab Fs-amplifier", Optics Express, vol. 17, No. 15, pp. 12230-12245 (2009).
Steinmeyer, "Brewster-angled chirped mirrors for high-fidelity dispersion compensation and bandwidths exceeding one optical octave", Optics Express, vol. 11, No. 19, pp. 2385-2396 (2003).
Tempea et al., "Titled-front-interface chirped mirrors", J. Opt. Soc. Am. B, vol. 18, No. 11, pp. 1747-1750 (2001).
Yost et al., "Efficient output coupling of intracavity high-harmonic generation", Optics Letters, vol. 33, No. 10, pp. 1099-1101 (2008).
International Search Report for PCT/EP2012/000342 dated May 9, 2012.

* cited by examiner

SPATIALLY SPLITTING OR COMBINING RADIATION BEAMS

FIELD OF THE INVENTION

The present invention relates to a method of spatially splitting a radiation beam including radiation components with different wavelengths, wherein the radiation beam in particular is superimposed from a first radiation component, which includes a fundamental wavelength in an optical wavelength range, and a second radiation component, which includes shorter wavelengths compared with the fundamental wavelength, e.g. second or higher harmonic wavelengths relative to the fundamental wavelength. Furthermore, the present invention relates to a method of spatially combining a first beam path of the first radiation component and a second beam path of the second radiation component to a common beam path. Furthermore, the present invention relates to a method of output coupling radiation from an enhancement cavity, to a method of conducting a pump-probe measurement, to an optical device being capable of wavelength-selective splitting or combining of radiation beams, and to an enhancement cavity provided with the optical device. Applications of the invention are available e.g. in the fields of operating high-power ultra-fast laser sources.

PRIOR ART

Over the past few decades, the development of high-power ultra-fast laser sources triggered intense research in the field of high-harmonic generation (HHG). Nowadays, for the generation of broadband extreme ultraviolet (XUV) light, HHG systems constitute a convenient table-top alternative to synchrotrons with numerous applications in fundamental research, technology and medicine. One of the most prominent HHG techniques relies on the enhancement of high-repetition-rate laser pulses inside of a passive resonator, also called "enhancement cavity" or "passive cavity" (see C. Gohle et al. in "Nature" 436, 234-237 (2005), R. J. Jones et al. in "Phys. Rev. Lett." 94, 193201 (2005), I. Hartl et al. in "Opt. Lett." 32, 2870-2872 (2007), A. Ozawa et al. et al. in "Phys. Rev. Lett." 100, 253901 (2008), D. C. Yost et al. in "Opt. Lett." 33, 1099-1101 (2008), and I. Pupeza et al. in "Opt. Lett." 12, 2052-2054 (2010)). In an intra-cavity focus of an enhancement cavity, peak intensities of $10^{13}$ W/cm$^2$ or more can be reached at MHz repetition rates. On the one hand, these intensities are necessary to trigger the highly nonlinear processes in a target medium, e.g. a noble gas target, customarily employed for HHG. On the other hand, the overall conversion efficiency of the fundamental radiation to the XUV is increased by the enhancement in the passive cavity. Furthermore, many applications like frequency comb or coincidence spectroscopy benefit from the high repetition rates of intra-cavity HHG.

The enhancement in a passive resonator is achieved by interferometrically overlapping the electric field of a seeding laser with the field circulating inside the enhancement cavity. In this manner, energy from the seeding laser is continuously coupled to the enhancement cavity. So far, the shortest intra-cavity pulse duration (27 fs) has been achieved with a power enhancement of 50 (C. Gohle et al., cited above), the largest demonstrated power enhancement for circulating femtosecond pulses (200 fs) amounts to 1800 (I. Pupeza et al., cited above) and continuous-wave cavities with enhancement factors on the order of $10^5$ have been demonstrated, see e.g. G. Rempe et al. in "Opt. Lett." 17, 363-365 (1992)). Recently, the ultra-fast MHz-repetition-rate enhancement cavity technology has been scaled up to mJ-level circulating pulse energies (I. Pupeza et al., cited above). Novel cavity designs (see PCT/EP2009/008278 and PCT/EP2010/005464, not published on the priority date of the present specification) seeded by novel, powerful laser sources (see e.g. T. Eidam et al. in "Opt. Lett." 35, 94-96 (2010), and P. Ruβbüldt et al. in "Opt. Express" 17, 12230-12245 (2009)) promise further substantial scaling in the near future.

Due to the fact that in a gas target the higher harmonics are generated collinearly to the fundamental radiation, one of the most challenging aspects of intra-cavity HHG in the context of high-power ultra-short pulses, remains coupling out the generated XUV light without severely affecting the circulating fundamental radiation. Currently, the circulating power inside the enhancement cavity for HHG is limited by the output coupling element and practically amounts to several kW.

Conventional XUV output couplers have been implemented with the following considerations. The power enhancement inside the enhancement cavity for HHG is limited by two effects. On the one hand, intra-cavity losses attenuate the electric field amplitude upon each round trip. These losses are mainly caused by the cavity optics and the interaction with the HHG nonlinear target medium. Typical low-loss, low-dispersion, highly reflecting dielectric mirrors for visible-infrared femtosecond pulses exhibit power loss values of around 50 ppm. The interaction with the target medium, e.g. a gas target, which is typically used for HHG, strongly depends on the cavity and the gas jet parameters. On the other hand, in the case of significantly large optical bandwidths, intra-cavity dispersion affects the circulating electric field, leading to a suboptimal overlap with the seeding field and, thus, to an enhancement limitation. In conclusion, in a high-finesse, high-power enhancement cavity, an output coupler for intra-cavity generated XUV light should satisfy a set of conditions:

C1: The XUV output coupling efficiency should be large.
C2: The absorption of the fundamental radiation due to the interaction with the output coupler should be small.
C3: The dispersion of the fundamental radiation upon interaction with the output coupler should be small.
C4: Nonlinear effects in the output coupler caused by the fundamental radiation should be small.
C5: Other losses, like depolarization of the fundamental radiation or scattering due to poor optical quality should be small.
C6: The heat caused by residual absorption should be efficiently dispersed.

The output couplers of the first demonstrated enhancement cavities for HHG were free-standing thin plates, transparent for the fundamental radiation, placed at Brewster's angle in the cavity beam path as the first optical elements after the HHG focus (see C. Gohle et al., R. J. Jones et al., A. Ozawa et al., cited above). The collinear superposition of the fundamental radiation and the generated XUV impinges on the surface of the plate (so-called Brewster plate). The p-polarized fundamental radiation is transmitted through the plate while the XUV radiation, for which the refractive index of the plate material is lower than 1, experiences total reflection at the surface, is therefore spatially decoupled from the fundamental radiation and, thus, is coupled out of the cavity.

Concerning criterion C1, the XUV reflectivity of materials transparent for the fundamental radiation under Brewster's angle for the fundamental radiation typically amounts to a few 10% at 60 nm and decreases for shorter wavelengths. Precise reflectivity values can be determined with available data bases. In order to meet the criteria C2 to C5, the thickness of the Brewster plate should be chosen as small as possible. However, decreasing the thickness implies two disadvantages. Firstly, mechanical processing and handling becomes more difficult, often limiting the feasibility of such plates or leading to poor optical quality. Secondly, the decreased thickness leads to a poor dissipation of the heat caused by the absorption in the plate, violating condition C6 and eventually leading to damage. So far all demonstrated enhancement cavity systems with an intra-cavity Brewster plate are limited to circulating powers below 15 kW.

There have been several approaches to circumvent the limitations of the Brewster plate output coupler. D. C. Yost et al. (cited above) have described and demonstrated the possibility to write a nanostructure in the last layer of the cavity mirror following the HHG focus. This optical element acts as a highly reflecting mirror for the fundamental radiation and as a diffraction grating for the generated XUV, thus providing the spatial separation of the higher harmonic from the fundamental radiation. The individual harmonics coupled out of the cavity are spatially dispersed. For several applications, this might constitute a substantial disadvantage. Moreover, the output coupling efficiency is comparable to the case of a Brewster plate. While this technique offers the prospect of scaling to higher circulating energies, the nanostructure might constitute a limiting factor due to undesired effects, such as local field enhancement of the fundamental radiation.

Other output coupling mechanisms, such as non-collinear HHG and output coupling through an aperture on the optical axis of the resonator, optionally using higher-order modes, are proposed by K. D. Moll et al. in "Opt. Expr." 14, 8189-8197 (2006). However, these techniques either violate one of the conditions listed above or complicate the enhancement cavity setup significantly. None of these methods has been successfully experimentally demonstrated to this day.

Thus, despite the limitations discussed above, for collinear output coupling of intra-cavity generated XUV light from a high-finesse resonator, the free-standing Brewster plate output coupler remains the most advantageous method.

Further optical components using Brewster angle incidence like the Brewster plate have been described by G. Tempea et al. in "J. Opt. Soc. Am. B" 18, 1747-1750 (2001) and in WO 2002/68999 A2 and by G. Steinmeyer in "Opt. Express" 11, 2385-2396 (2003). According to G. Tempea et al., a wedge having a wedge angle of 1° has been placed on a dielectric mirror for improving impedance matching of the dielectric mirror to the environment and for reducing the undesired fluctuations of the group-delay dispersion as a function of optical frequency, typical for plane-parallel coatings, whereas G. Steinmeyer has proposed to adjust a dielectric mirror with the Brewster angle relative to the incident radiation. With these conventional applications, the optical components have not been used for any spatial separation of beam components with different wavelengths but for a low-dispersion design of an optical set-up.

Beam splitting of superimposed radiation is not only a task for coupling higher-harmonic radiation out of enhancement cavities, but also for e.g. XUV output coupling for higher harmonic radiation generated in a laser oscillator cavity or separating the XUV from the fundamental radiation components in single-pass HHG systems. The same task of beam splitting applies for frequency components generated by the fundamental radiation by means of other non-linear processes than HHG, such as e.g. second harmonic generation (SHG), implemented either in an enhancement cavity or in a single-pass set-up. Moreover, the two frequency components need not be correlated by a nonlinear process, but can stem from uncorrelated radiation sources.

Beam splitting using reflection on optical elements carrying a dichroic surface coating has been described e.g. in U.S. Pat. No. 5,225,893 A and GB 2 286 694 A. However, the conventional application of dichroic surface coatings is to optical wavelengths. Dichroic surface coatings cannot be used e.g. in the XUV range as the radiation would be absorbed by the surface coating.

Furthermore, the task of combining two spatially separated beams with different frequency components is closely related to their separation and can typically be solved by operating a beam splitting device in the opposite propagation direction. Conventional techniques use dichroic mirrors for combining beams with different wavelengths (see e.g. US 2006/0221336 A1). However, the application of dichroic mirrors is restricted again if one of the beams has a wavelength in the XUV range as this beam would be absorbed by the dichroic mirror.

OBJECTIVE OF THE INVENTION

The objective of the invention is to provide improved methods of spatially splitting or combining radiation beams including radiation components with different wavelengths, wherein the beam splitting or combining methods are to be capable of avoiding disadvantages of conventional techniques. In particular, a beam splitting method is to be capable of output coupling higher harmonic radiation e.g. from an enhancement cavity, whereas conditions for operating the enhancement cavity can be optimized. Furthermore, the objective of the invention is to provide an improved optical device being capable of wavelength-selective separation or combination of radiation components while avoiding disadvantages of conventional techniques. Furthermore, the objective of the invention is to provide an improved method of output coupling second or higher harmonic radiation from an enhancement cavity and/or an improved enhancement cavity provided with an optical splitting device.

These objectives are solved by methods and/or devices comprising the features of the independent claims. Advantageous embodiments and applications of the invention are defined in the dependent claims.

SUMMARY OF THE INVENTION

According to a first general aspect of the invention, a method of spatially splitting radiation components of a primary radiation beam is provided, wherein the radiation components are reflected in a wavelength-selective manner at different interfaces of an optical device having a deflection mirror and a refractive plate element onto different reflected beam paths. The primary radiation beam is formed by superimposing a first radiation component including an optical wavelength (wavelength in the IR, VIS or UV range) and a second radiation component having a wavelength shorter than the first radiation component wavelength, the second radiation component preferably including second or higher harmonic radiation relative to the first radiation. Typically, the second radiation component has a wavelength equal to an integer fraction of the first radiation component wavelength. In the superimposed primary radiation beam, the first and second radiation components travel parallel to each other, in particular collinear to each other along a common primary beam path. The first radiation component hits the optical device with p-polarization, typically in a surrounding medium of reduced pressure compared with atmospheric pressure, e.g. vacuum. After the reflection, the first and second radiation components travel along first and second reflected beam paths which differ from each other at least with regard to a mutual beam path distance, but preferably also with regard to their output angles relative to the surface of the optical splitting device.

According to the invention, the primary radiation beam is directed onto the deflection mirror having a reflective mirror surface and carrying the refractive plate element. The optical splitting device is adjusted such that the primary radiation beam impinges with a predetermined incident angle on the refractive plate element, wherein the incident angle preferably is the Brewster angle with regard to the optical wavelength of the p-polarized first radiation component. If the first radiation component is pulsed laser light (laser pulses), the Brewster angle is selected with reference to a centre wavelength of the laser pulses. Otherwise, if the first radiation component is continuous laser light (cw laser light), the Brewster angle is selected with reference to the single wavelength of the cw laser light. Selecting the Brewster angle may include selecting an exact Brewster angle value or a deviating angle value having such a deviation from the exact Brewster angle value, that the overall losses of the primary radiation beam at the deflection mirror and the refractive plate element are minimized. Thus, the first radiation component is transmitted through the refractive plate element without a significant reflection on a plate surface thereof. At the reflective mirror surface (or: reflective mirror coating), e.g. a single or multi layer reflective mirror surface, the first radiation component is reflected back through the refractive plate element onto a first reflected beam path. Furthermore, according to the invention, the second radiation component is reflected at a plate surface of the refractive plate element onto a second reflected beam path. The reflection is based e.g. on regular reflection (Fresnel reflection) or external total reflection. Due to the refractive effect of the refractive plate element, the first and second reflected beam paths are displaced relative to each other or—depending on the plate shape—even oriented with different directions. Accordingly, the second radiation component, which is e.g. second or higher harmonic radiation, is spatially decoupled (spatially separated) from the first radiation component, which is e.g. a fundamental radiation circulating in an enhancement cavity. The second radiation component coupled out of the cavity is spatially separated from the first component using the optical device. As the Brewster condition is not fulfilled for the second radiation component, a certain portion may travel through or be absorbed by the refractive plate element or the remaining mirror, so that this remaining portion is absorbed.

According to a second general aspect of the invention, the above method of spatially splitting radiation components is reversed for combining beam paths of two spatially separated beams having different wavelengths. Thus, a method of spatially combining a first beam path of the first radiation component including an optical wavelength and a second beam path of the second radiation component having a wavelength shorter than the first radiation component wavelength to a common beam path is provided. The beam paths combining method comprises a first step of directing the beam paths of the first and second radiation components onto the deflection mirror having the reflective mirror surface and carrying the refractive plate element as noted above. The first beam path of the first radiation component is deflected at the reflective mirror surface and the second beam path of the second radiation component is deflected at the plate surface of the refractive plate element, so that the reflected first and second beam paths are combined to the common beam path.

Advantageously, a novel mechanism for wavelength-selective spatial splitting or combining radiation beams, in particular an optical device for collinear output coupling of intra-cavity generated XUV, UV, or VIS is presented. The optical device, which is e.g. a wedge-on-mirror output coupler (WOMOC, see below), is designed to circumvent several limitations imposed by current output couplers. While the spatial separation or combination of the first and second radiation components at the interfaces of the optical device relies on the same physical principle as in the case of the free-standing Brewster plate output coupler, the invention yields the following substantial advantages, in particular with regard to optical splitting.

I) Robustness. As the optical device, a robust, bulky optical element can be used enabling easy handling and processing in contrast to free-standing foils/plates. In particular, this allows for the production of the refractive plate element as a very thin wedged or plan-parallel layer, introducing low additional absorption, nonlinearities, heat production and other losses to the fundamental radiation. Furthermore, it facilitates good control of the optical quality of the surface, even for a very thin layer. Also, this bulky element is easier to align, to handle and to mount and mechanically more stable than a free-standing thin plate.

II) Efficient heat transport. The refractive plate element, through which the first radiation component (e.g. fundamental radiation) passes, is attached to the deflection mirror, i.e. to a bulky optical element, enabling the efficient transport of heat generated by the absorption in the material of the refractive plate element, away from the illuminated area.

III) Dispersion control. While the first radiation component passes through the refractive plate element, it accumulates group delay dispersion. By knowing the material and geometric properties of the refractive plate element, this dispersion can be estimated and compensated, e.g. by the design of the mirror coating underlying the refractive plate element or by another cavity mirror. By a slight parallel translation of the optical splitting device, the length of the first radiation component beam path inside the refractive plate element can be varied, such that the beam angles are not affected. In this manner, a fine tuning of the first radiation component dispersion upon reflection at the refractive plate element can be achieved. In particular in an enhancement cavity, the significance of this property increases with shorter pulses. Thus, both the upper layer of the refractive plate element and the Brewster angle incidence represent advantages from the point of view of the low-dispersion design criterion.

Preferably, the first radiation component is a fundamental radiation travelling in an enhancement cavity and the second radiation component is a radiation beam, generated in the enhancement cavity by a nonlinear interaction of the fundamental radiation with a target medium, e.g. as HHG, or SHG generation. Thus, according to a third general aspect of the invention, a method of output coupling second or higher harmonic radiation from an enhancement cavity is proposed. The second or higher harmonic radiation is generated in the enhancement cavity by the interaction of the fundamental radiation with the target medium. The fundamental radiation is superimposed with the second or higher harmonic radiation in a common primary radiation beam. According to the invention, the second or higher harmonic radiation is separated from the fundamental radiation with the splitting method according to the above first aspect. The higher harmonic radiation is deflected onto the second reflected beam path, thus deviating from the beam path of the fundamental radiation circulating in the cavity.

According to a fourth general aspect of the invention, a method of conducting a pump-probe measurement of a sample is provided wherein first and second beam paths of the pump and probe beams, resp., are combined to a common beam path with the beam combining method according to the above second aspect of the invention.

According to a fifth general aspect of the invention, an optical device is provided which is configured for spatially splitting or combining radiation beams, e.g. splitting a primary radiation beam into a first radiation component including an optical wavelength and a second radiation component having a wavelength shorter than the first radiation wavelength, in particular according to a method of the above first aspect of the invention, or e.g. combining beam paths in particular according to a method of the above second aspect of the invention. According to the invention, the optical device comprises a deflection mirror having a reflective mirror surface and a refractive plate element carried on the reflective mirror surface. The reflective mirror surface and the refractive plate element are configured such that the first radiation component is transmitted through the refractive plate element and reflected on the reflective mirror surface, while the second radiation component is reflected at a plate surface of the refractive plate element and absorbed by the material of the refractive plate element and the remaining mirror. Advantageously, the refractive plate element can be made from any material which is transparent for the first radiation component, has a high reflectivity for the second radiation component and has minimum optical non-linearity. Preferably, the refractive plate element is made of $SiO_2$ or $Si_3N_4$.

According to a sixth general aspect of the invention, an enhancement cavity device is provided, which comprises cavity mirrors spanning a cavity beam path. Two curved cavity mirrors are provided which are adapted for focussing a fundamental radiation component along the cavity beam path at a focus position. A target medium is supplied at focus position in the cavity beam path, so that with an irradiation of the target medium with the fundamental radiation component, a second or higher harmonic radiation component is generated collinearly with the cavity beam path. According to the invention, the enhancement cavity device includes the optical splitting device according to the above second aspect of the invention. The optical splitting device is oriented such that the fundamental radiation component is reflected along the cavity beam path and the second or higher harmonic radiation component is displaced or deflected from the cavity beam path. Furthermore, the optical device is oriented such that the plate surface of the refractive plate element with reference to the fundamental radiation component forms a Brewster angle relative to the cavity beam path.

According to a preferred embodiment of the invention, the refractive plate element is a wedged plate. The refractive plate element has a plate body with surfaces being inclined relative to each other. The upper (exposed) plate surface is inclined relative to the reflective mirror surface of the deflection mirror. In this case, the first and second beam paths of the first and second reflected radiation components are non-parallel relative to each other and displaced on the plate surface of the refractive plate element by a beam path distance. With the splitting embodiment of the invention, using the wedged plate results in different output angles of the reflected radiation components relative to the optical device. Advantageously, even with practical beam diameters of the first and second radiation components in an enhancement cavity which yield overlapping radiation fields at the optical device, an efficient separation of the radiation components can be obtained in the far field.

Preferably, the wedged plate has a wedge angle ($\alpha$) of at least 0.05°, in particular at least 0.3° and/or below 1.0°, in particular below 0.8°. If, according to a particularly preferred variant of the invention, the refractive plate element has a wedged plate body with a triangular or trapezoidal cross-sectional shape, advantages for manufacturing the refractive plate element using a polishing process can be obtained. Preferably, the maximum thickness ($h_w$) of a wedged portion of the wedged plate, e.g. the maximum thickness of the plate with the triangular cross-sectional shape or the maximum thickness of the wedge in a plate with the trapezoidal cross-sectional shape, is at least 10 μm, in particular at least 30 μm, and/or at most 300 μm, in particular at most 50 μm.

According to an alternative embodiment of the invention, the refractive plate element is a plane-parallel plate. The refractive plate element has a plate body with plane surfaces being parallel to each other. In this case, the first and second beam paths are parallel to each other and displaced by the beam path distance. Preferably, the refractive plate element has a thickness of at least 1 μm, in particular at least 5 μm. Using a plane-parallel plate has the following advantage. The angle of incident equals the angle of reflection in particular for the first radiation components. As a result, with the splitting embodiment of the invention, the finesse of the resonator cavity can be improved and the enhancement factor can be increased. A plane-parallel plate is preferably used in an enhancement cavity for enhancing cw laser light.

According to a preferred variant of the invention, the refractive plate element has a plane plate surface which may have advantages in terms of adjusting the optical device in an optical set-up. Alternatively, according to a further variant of the invention, a curved plate surface can be provided. The curved plate surface may provide at least one of the following advantages. Firstly, the plate surface can be curved such that it is adapted to the phase front of the first radiation component. As an example, due to the divergence of the fundamental radiation in an enhancement cavity, the phase front of the fundamental radiation is curved. With the curved plate surface the Brewster angle can be optimized for the whole phase front, so that unintended reflections of the fundamental radiation at the plate surface can be minimized. Secondly, the plate surface can be curved such that the second radiation component can be focussed in the far-field, e.g. to an additional mirror or grating for further deflecting the second radiation component away from the enhancement cavity or to an experiment employing the generated radiation.

With the preferred application of the optical splitting device in an enhancement cavity, the deflection mirror with the refractive plate element can be arranged in a cavity section between one of the two curved mirrors and the focus position. In this case, the second or higher radiation component directly impinges on the refractive plate element without passing further optical elements, thus increasing the output coupling efficiency. With this embodiment, the curved cavity mirrors preferably are arranged for an asymmetric focusing so that the focus position has different distances from each of the curved cavity mirrors. Advantageously, this facilitates the positioning of the optical splitting device in the enhancement cavity.

Alternatively, the deflection mirror with the refractive plate element can be arranged outside a cavity section between one of the two curved mirrors including the focus position. In this case, the fundamental radiation beam has a reduced divergence, thus improving the adjustment of the Brewster angle.

BRIEF DESCRIPTION OF THE DRAWINGS

Further details and advantages of the invention are described in the following with reference to the attached drawings, which show in.

PREFERRED EMBODIMENTS OF THE INVENTION

Figure 1:
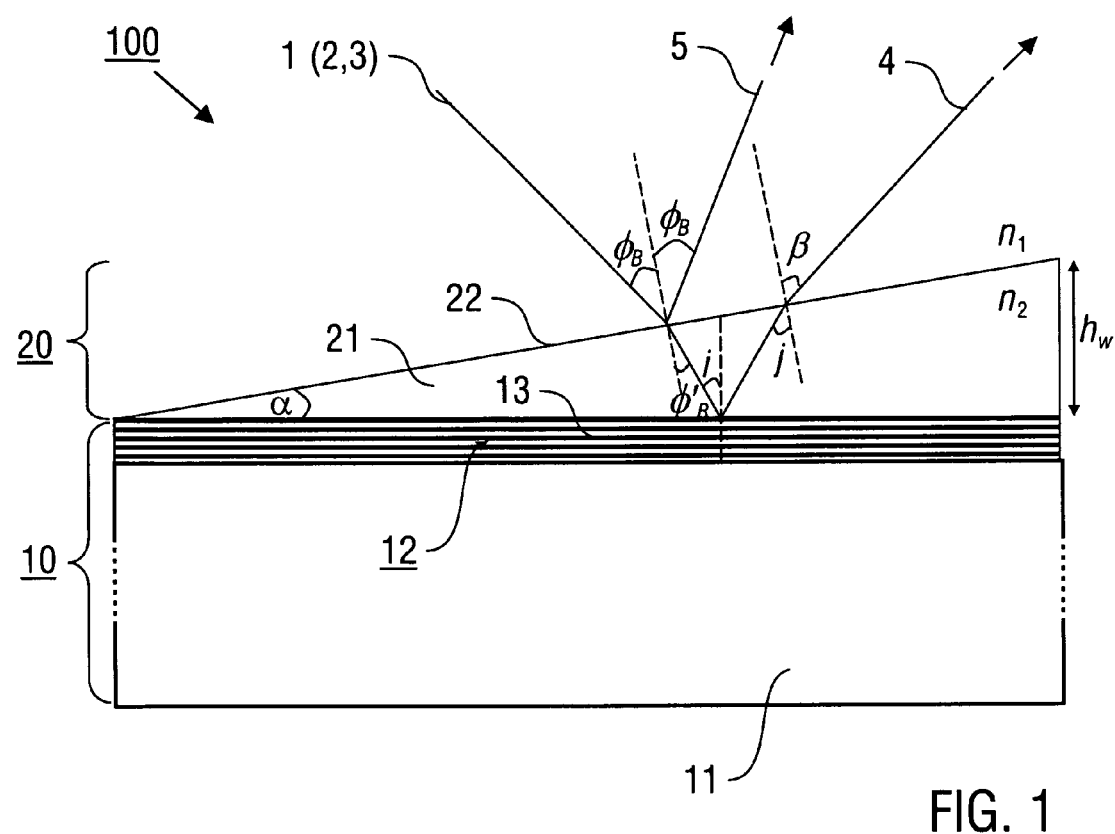
FIG. 1: a first embodiment of an optical device and a method of spatially splitting a primary radiation beam.

Embodiments of the invention are described in the following with particular reference to the design of the optical device and the application thereof, in particular for output coupling of higher harmonic radiation from an enhancement cavity. Details of the cavity design or operation, in particular the HHG process is not described as it is known as such from prior art. It is emphasized that the invention is not restricted to the enhancement cavity application but rather can be implemented in an analogue manner e.g. in a XUV, UV, or VIS output coupling device for higher harmonics generated inside a high-power laser oscillator cavity or for separating the XUV, UV, or VIS from the fundamental radiation in single-pass systems.

According to the invention, the optical device can be used as a radiation splitting device or as a beam paths combining device. With regard to FIGS. 1 and 7, exemplary reference is made to the splitting function of the optical device. It is emphasized that the beam paths combining function can be realized in an equal manner simply by reversing the traveling directions of the radiation beams.

Features of an optical device 100, the manufacturing thereof and a method of spatially splitting a primary radiation beam 1 according to a first embodiment of the invention are described in the following with reference to FIG. 1. The optical device 100 (shown with a schematic cross-sectional view, not to scale) comprises a deflection mirror 10 and a wedge-shaped refractive plate element 20. A main application of this optical device 100 is a so-called Wedge-on-Mirror Output Coupler (WOMOC) as further described below with reference to FIG. 4.

The deflection mirror 10 includes a mirror substrate 11, made of e.g. $SiO_2$ and a reflective mirror surface 12 with multiple dielectric layers 13, made of e.g. $SiO_2$ and $Ta_2O_5$. The reflective mirror surface 12 with the dielectric layers 13 have e.g. a circular shape with a diameter of 12 mm. The deflection mirror 10 is made e.g. like a conventional high-reflecting dielectric mirror used in enhancement cavities. It should be mentioned that the highly reflecting mirror underlying the wedge layer needs not be a dielectric mirror. In principle, other mirror technologies could be used to realize the same spatial separation effect caused by the wedged layer as outlined below. Thus, as an alternative, another type of mirror can be used including a reflective mirror surface, e.g. made of one single reflective layer or the material of the mirror substrate itself. As a further alternative, a curved mirror can be used instead of the plane mirror shown in FIG. 1.

The refractive plate element 20 is arranged on the reflective mirror surface 12 opposite to the mirror substrate 11. The thickness of the refractive plate element 20 is increasing from zero at one edge thereof to a predetermined maximum thickness $h_w$ (e.g. some 10 µm) at the opposite edge. Thus, a triangular cross-sectional shape of the refractive plate element 20 with a wedge angle $\alpha$ is formed. The plate body 21 of the refractive plate element 20 has an exposed plate surface 22 with plane shape. As examples, the plate body 21 may comprise $SiO_2$ or $Si_3N_4$ as it is further discussed below with reference to FIGS. 2 and 3. The wedge angle $\alpha$ is e.g. 0.5°.

As alternative features of the invention, a trapezoidal cross-sectional shape of the refractive plate element 20 and/or a curved shape exposed plate surface 22 can be provided. In the latter case, an effective wedge angle $\alpha$ can be defined, like an average angle or an angle of the illuminated plate surface. Furthermore, the optical device 100 of FIG. 1 can be considered as a dielectric multilayer structure, of which the last (exposed) layer is wedged at the wedge angle $\alpha$.

The optical device 100 can be manufactured according to one of the following procedures. For several materials, the wedge structure in the upper layer of the optical splitting device 100 can be obtained by firstly producing a homogenous layer on top of the multilayer stack and subsequently polishing this layer under the desired angle $\alpha$. The necessary initial thickness of this layer primarily depends on the material (which determines the Brewster angle), on the fundamental radiation component beam size (diameter) and on the wedge angle $\alpha$. Typical values of this thickness are on the order of a few µm and can be produced in the same coating run as the other mirror coating layers, employing e.g. ion-beam sputtering.

The target thickness $h_w$ of the upper plate body 21 layer results from the incident beam diameter and the wedge angle $\alpha$. If this thickness is too large to be sputtered, the wedge layer can be optically contacted (optical contact bonding) to the surface of the specially designed highly reflecting mirror. The wedge can be produced either before or after the optical contacting process.

Another option is an "upside-down" production, in which the highly reflecting multilayer structure is coated on a bulk substrate, out of which the wedge is subsequently polished. For mechanical stability, a supporting substrate can be glued or optically contacted to the last layer of the dielectric coating before the polishing of the upper layer.

The optical device 100 is configured e.g. for spatially splitting a primary radiation beam 1 formed by superimposing a first radiation component 2 including at least one optical wavelength and second radiation component 3 having a wavelength shorter than the first radiation wavelength. The primary radiation beam 1 is e.g. an intra-cavity beam in an enhancement cavity, while the first radiation component 2 is the fundamental radiation in the enhancement cavity and the second radiation component 3 is the higher-harmonic radiation, including at least the second harmonic of the fundamental radiation.

For splitting the primary radiation beam 1, the reflective mirror surface 12 is arranged for reflecting the first radiation component 2, while the refractive plate element 20 is arranged for reflecting the second radiation component 3. The physical principle employed for this spatial separation of the fundamental radiation and the higher harmonic component of the intra-cavity beam is discussed in the following.

The p-polarized fundamental radiation component 2 impinges on the plate surface 22 under the Brewster angle $\phi_B$ for the material of the plate body 21. The higher harmonic component 3, in particular XUV radiation, is reflected at the plate surface 22 under the angle $\phi_B$ as the second reflected beam 5. The fundamental radiation component 2 penetrates the plate element 20 and propagates towards the next material interface, on which it impinges under an angle i, which is well-defined by $\phi_9$ and $\alpha$. The subsequent dielectric layers are designed to act as a high reflector for the fundamental radiation component 2. The reflected portion travels back through the wedged plate element 20 and impinges on its surface as the first reflected beam 4 under an angle j. As $\alpha$ and the fundamental beam divergence are both small, the deviation of j from the Brewster angle for this interface is small, such that (a) the overall losses of the fundamental beam upon reflection at the optical splitting device 100 are sufficiently small and (b) the fundamental radiation component 4 is reflected by the optical splitting device 100 under a slightly larger angle β than the higher harmonic component 5, providing the spatial separation of the two components. In the following, the separation angle is derived analytically.

For the fundamental radiation wavelength range, let the real part of the refractive index of the surrounding medium be $n_1$ (typically vacuum) and of the wedge material $n_2$. Then, Brewster's angle for the p-polarized fundamental beam is given by:

$$\phi_B = \arctan(n_2/n_1) \quad (1)$$

The higher harmonic component 3 will be reflected by the optical splitting device 100 under this angle. By Snell's law, the refraction angle for the beam transmitted through the $n_1$-$n_2$-interface equals:

$$\phi'_B = \arcsin(n_1/n_2 \cdot \sin(\phi_B)) \quad (2)$$

The incidence angle i of the fundamental radiation component 2 on the subsequent layer is:

$$i = \phi'_B + \alpha \quad (3)$$

A closer look at FIG. 1 reveals that the outgoing angle j of the reflected fundamental component 2 is:

$$j = \phi'_B + 2\alpha \quad (4)$$

Applying Snell's law again the following output angle of the fundamental component 2 is obtained with respect to the normal of the plate surface 22:

$$\beta = \arcsin(n_2/n_1 \cdot \sin(j)) \quad (5)$$
$$= \arcsin(n_2/n_1 \cdot \sin(\arcsin(n_1/n_2 \cdot \sin(\arctan(n_2/n_1))) + 2\alpha))$$

Now the separation angle between the higher harmonic component 3 and the fundamental radiation component 2 upon reflection at the optical splitting device 100 can be obtained from the output angles β and $\phi_B$:

$$\delta = \beta - \phi_B \quad (6)$$

To calculate the spatial separation d between the centres of the two radiation components 2, 3 after a propagation distance L, it can be assumed for simplicity that both the higher harmonic and the fundamental radiation components leave the optical splitting device 100 at the same place, with an angle δ between them, because the plate body 21 provides a very thin layer. Then, the following relation holds:

$$d = L \cdot \tan(\delta) \quad (7)$$

The reflection power losses $R_{loss}$ of the fundamental radiation component 2 at the optical splitting device 100 owed to the deviation from Brewster's angle when the beam exits the wedge, assuming a collimated beam, can be calculated according to the Fresnel equations and are given by the following expression:

$$R_{loss} = \left[ \frac{n_2 \sqrt{1 - \left(\frac{n_2}{n_1}\sin j\right)^2} - n_1 \cos j}{n_2 \sqrt{1 - \left(\frac{n_2}{n_1}\sin j\right)^2} + n_1 \cos j} \right]^2 \quad (8)$$

Figure 2:
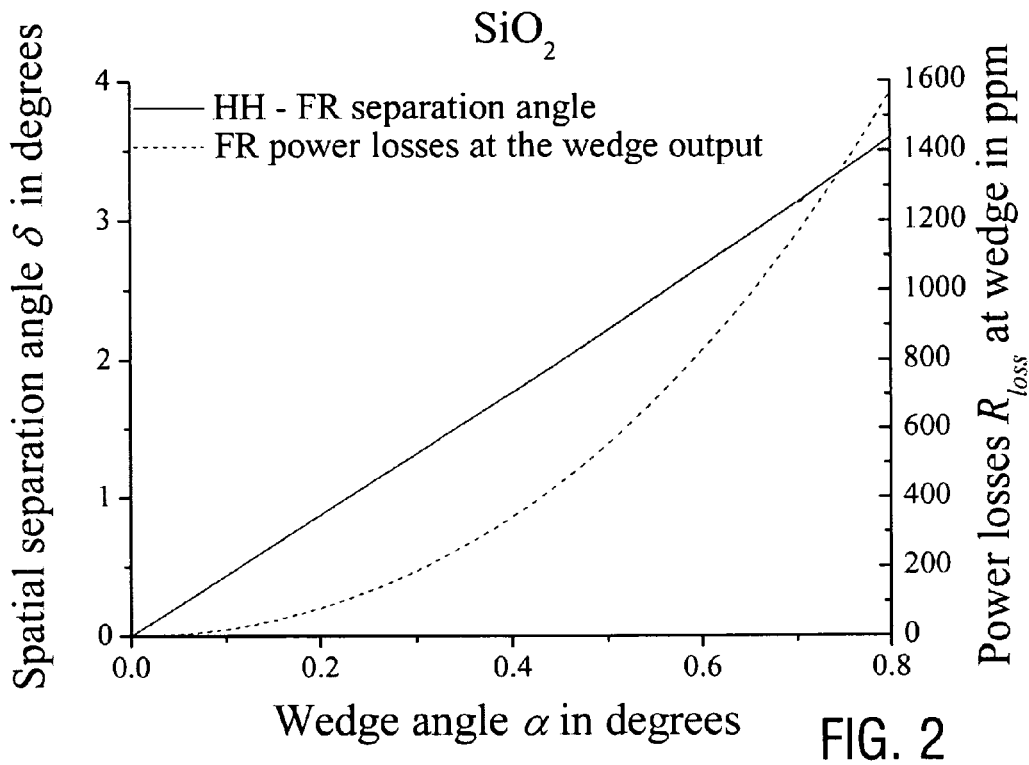
FIGS. 2 and 3: quantitative examples illustrating the spatially splitting of a primary radiation beam with the embodiment of FIG. 1.
Figure 3:
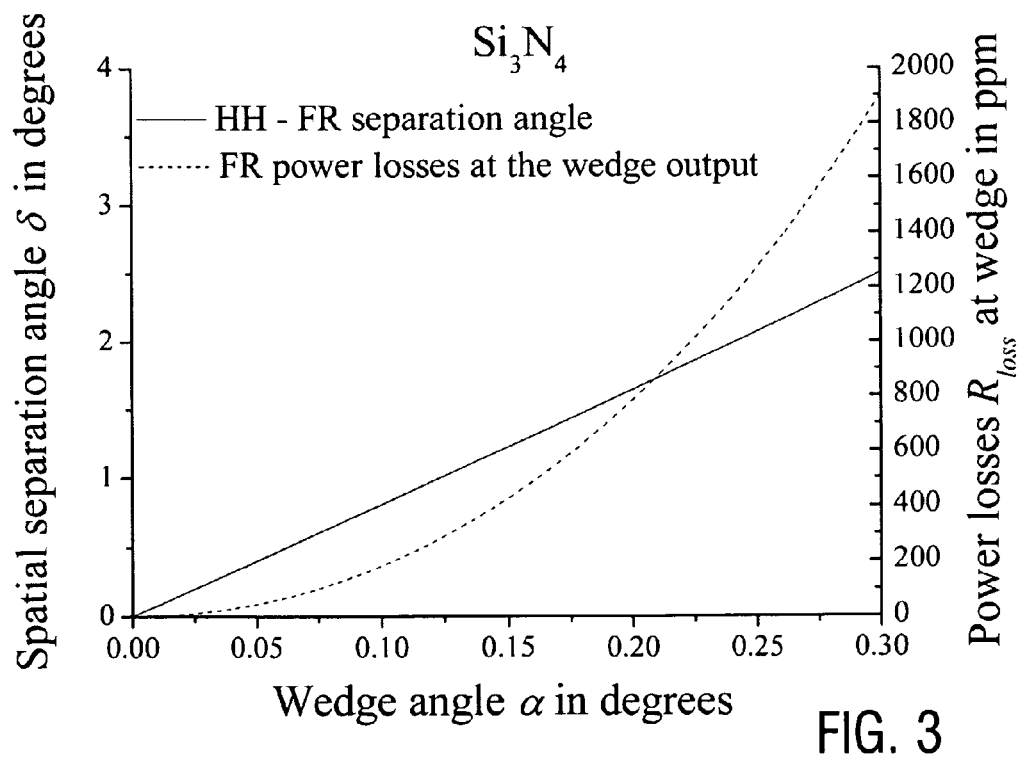

As quantitative examples for the above calculation, the materials $SiO_2$ and $Si_3N_4$ with the respective visible-infrared refractive indexes $n_2$ 1.47 and 2 are considered. With $n_1=1$ and the respective $n_2$ in the above equations, the Brewster angles are $\phi_B=55.77°$ and $\phi_E=63.43°$ for $SiO_2$ and $Si_3N_4$, respectively. FIGS. 2 and 3 show the spatial separation angle δ (solid line) as well as the losses $R_{loss}$ (dashed line) as functions of the wedge angle α for the two materials. The wedge-induced loss $R_{loss}$ limits the theoretically achievable power enhancement in an enhancement cavity containing this element to $1/R_{loss}$ (see e.g. C. Gohle et al., cited above, for details). The XUV power reflectivity at 60 nm amounts to 7% and 29.5% for $SiO_2$ and $Si_3N_4$, respectively.

Figure 4:
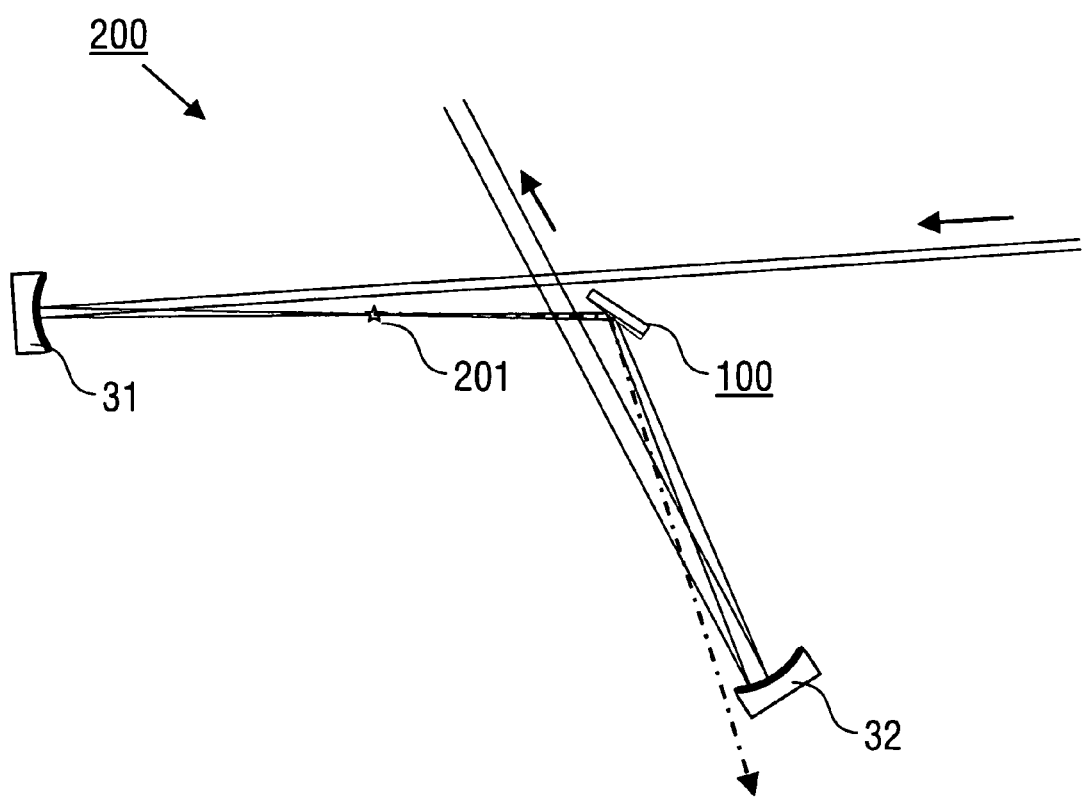
FIGS. 4 and 5: embodiments of inventive enhancement cavities provided with the optical device of FIG. 1.

According to a preferred application of the invention, an enhancement cavity device 200 according to the invention comprises a plurality of cavity mirrors 31, 32 and the inventive optical splitting device 100. In particular the setup around the intra-cavity focus 201 is shown in FIG. 4 (for visualization purposes, not to scale). The cavity mirrors 31, 32 are arranged in a ring cavity (partially shown) coupled with a seeding laser source (not shown) and a target medium source (not shown). Mirrors 31 and 32 are curved mirrors, while all other cavity mirrors can be plane or curved mirrors and are left out here for simplicity.

As an example, the enhancement cavity device 200 is a 78 MHz repetition rate infrared fundamental radiation cavity, similar to the enhancement cavity described e.g. by I. Pupeza et al. (cited above). In contrast to the conventional enhancement cavity, an asymmetric focusing is provided to increase a distance from the cavity focus 201 to the subsequent curved mirror 32. Thus, the inclusion of the optical splitting device 100 is facilitated.

The radii of curvature of the spherical mirrors 31 and 32 are 100 and 200 mm, respectively. In the cavity stability range center this implies a focus radius of 22 μm. The optical splitting device 100 is placed 500 mm after the focus 201. The fundamental radiation beam radii at the mirror 31, the optical splitting device 100 and the mirror 32 are 0.7 mm, 0.7 mm and 1.6 mm, respectively. The wedge material is e.g. $SiO_2$, such that the incidence Brewster angle equals 55.77°. For optimum separation a wedge angle α=0.3° was chosen, leading to a separation angle δ=1.30 between the XUV (e.g. λ=60 nm) and the fundamental radiation components (e.g. λ=1040 nm).

After propagating 500 mm from the optical splitting device 100 to mirror 32, the centres of the two radiation component beams are more than 11 mm apart, making the XUV output coupling possible. The losses $R_{loss}$ amount to 187 ppm, in principle allowing for a power enhancement exceeding 5000.

Alternatively, the curved mirror after the HHG focus (i.e. corresponding to mirror 32) could be placed under oblique incidence, as can be done e.g. with parabolic or cylindrical mirrors. This mirror could on the one hand nearly collimate the fundamental radiation beam and on the other hand reflect a substantial portion of the generated XUV due to the large angle of incidence. Placing the optical device after this mirror could therefore bare several advantages over placing it between the focus and this mirror. Firstly, the fundamental radiation is collimated, implying Brewster angle incidence over the entire beam profile. Secondly, the spatial constraint imposed on the separation angle δ, and, therefore on the wedge angle α by the mirror following the optical device, can be loosened significantly if the mirror following the optical device 100 is placed at a large distance.

Figure 5:
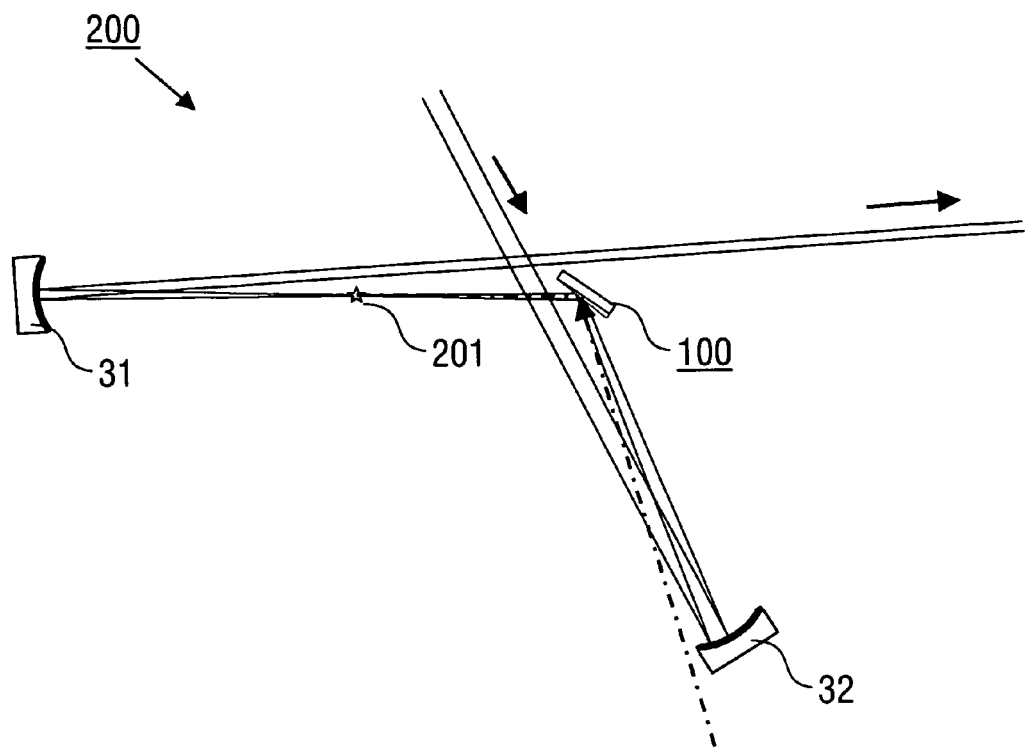

In a reversed situation, a radiation component is coupled into an enhancement cavity 200 as it is illustrated in FIG. 5. The radiation component is coupled with the fundamental radiation circulating the cavity using the optical device 100 as described above. The embodiment of FIG. 5 can be applied e.g. for coincidence spectroscopy or investigations of correlated electron dynamics.

Figure 6:
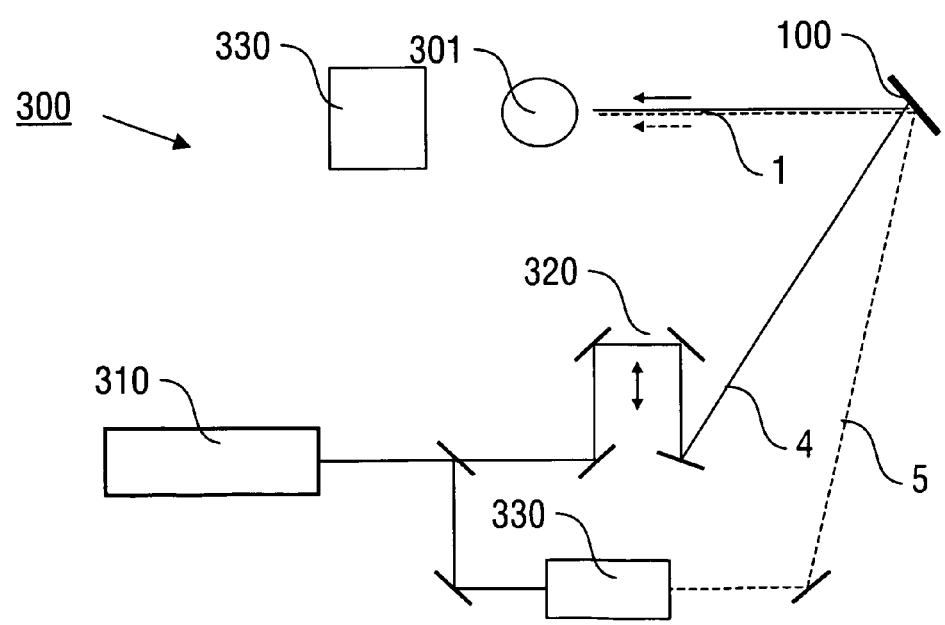
FIG. 6: an embodiment of a pump-probe-measurement setup provided with the optical device of FIG. 1.

FIG. 6 schematically illustrates another application of the beam paths combining embodiment of the invention with a pump-probe measurement setup 300. Fundamental radiation having an optical wavelength is created with a pulse laser 310. The fundamental radiation provides a pump beam travelling via a time delay section 320 along a first beam path 4 to the optical device 100. Another portion of the fundamental radiation is input in a device 330 for generating second or higher radiation, e.g. XUV radiation, creating a probe beam with a wavelength shorter than the wavelength of the fundamental radiation. The probe beam travels along a second beam path 5 to the optical device 100, where both first and second beam paths 4, 5 are combined to a common beam path 1. A sample 301 to be investigated is arranged in the beam path 1, where it is subjected to the pump or probe beams, and a response of the sample is sensed with a detector device 340 as it is known from conventional pump-probe experiments.

Figure 7:
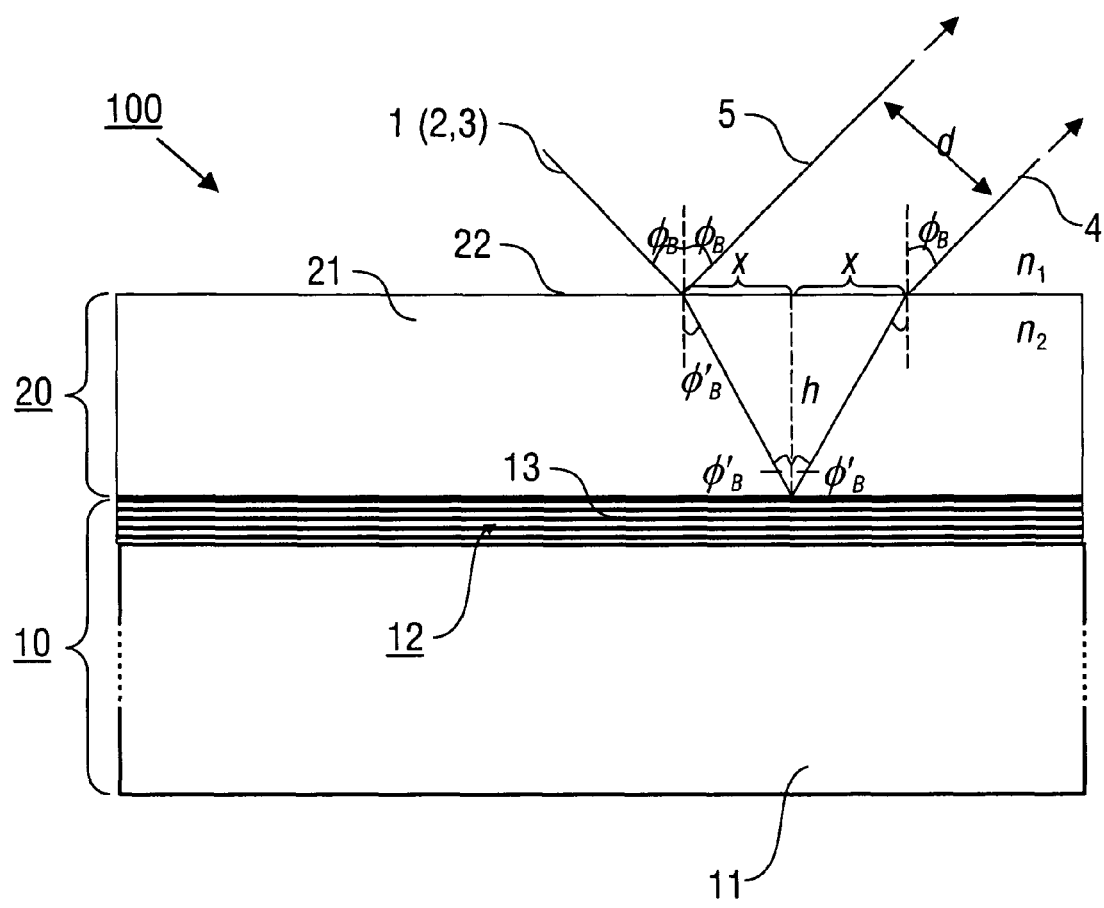
FIG. 7: a further embodiment of an optical device and a method of spatially splitting a primary radiation beam.

According to an alternative embodiment of the invention, the optical device 100 comprises a deflection mirror 10 and a plane-parallel refractive plate element 20 as shown with a schematic cross-sectional view (not to scale) in FIG. 7. The deflection mirror 10 includes a mirror substrate 11 and a reflective mirror surface 12 with multiple dielectric layers 13 or other mirror types as described above with reference to FIG. 1. The plane-parallel refractive plate element 20 is arranged on the reflective mirror surface 12 opposite to the mirror substrate 11. The thickness h of the refractive plate element 20 is e.g. 5 mm. The plate body 21 of the plate element 20 may comprise $SiO_2$ or $Si_3N_4$. As an alternative feature of the invention, a curved shape exposed plate surface 22 can be provided, e.g. for matching the Brewster angle over the entire beam profile. The optical device 100 of FIG. 7 can be manufactured according to a conventional procedure for applying a plate-shaped layer on a mirror.

For splitting the primary radiation beam 1, the reflective mirror surface 12 is arranged for reflecting the first radiation component 2, while the refractive plate element 20 is arranged for reflecting the second radiation component 3 (as in FIG. 1). With the relationships $$\frac{x}{h} = \tan\phi'_B \tag{9}$$

and $$\frac{d}{2x} = \cos\phi_B \tag{10}$$

the beam path distance d of the first and second reflected beams 4, 5 can be expressed with $$d = 2h \cdot \cos\phi_B \cdot \tan\phi'_B \tag{11}$$

In a practical example using a plate body 21 made of $SiO_2$ having a thickness h=5 mm, it follows $\cos\phi_B$=0.56 and $\tan\phi'_B$=0.68, so that d=3.83 mm.

The features of the invention disclosed in the above description, the drawings and the claims can be of significance both individually as well as in combination for the realisation of the invention in its various embodiments.

The invention claimed is:

1. A method of out-coupling harmonic radiation from an enhancement cavity having cavity mirrors arranged as a ring cavity and a target medium, comprising the steps of:
   travelling of a fundamental radiation including an optical wavelength in the enhancement cavity,
   generating second or higher harmonic radiation relative to the optical wavelength in the enhancement cavity by an interaction of the fundamental radiation with the target medium, and
   separating the second or higher harmonic radiation from the fundamental radiation with a splitting method of spatially splitting the fundamental radiation and the second or higher harmonic radiation from each other, wherein the splitting method comprises the steps of:
   directing the fundamental radiation onto a deflection mirror having a reflective mirror surface and carrying a wedged refractive plate element, which is transmissive for the fundamental radiation and which has a refractive effect on the fundamental radiation wherein the wedged refractive plate element has a maximum thickness of at most 50 μm, and
   reflecting the fundamental radiation at the reflective mirror surface and reflecting the second or higher harmonic radiation at an exposed plate surface of the refractive plate element, wherein
   due to said refractive effect of said plate element the fundamental radiation reflected at said reflective mirror surface and the second or higher harmonic radiation reflected at said exposed plate surface of said plate element travel along different first and second beam paths, wherein the first and second beam paths are non-parallel relative to each other and mutually displaced on the plate surface of the refractive plate element.

2. The method according to claim 1, wherein the wedged refractive plate element has a wedge angle α of at least 0.05°.

3. The method according to claim 2, wherein the wedged refractive plate element has a wedge angle α of at least 0.3°.

4. The method according to claim 1, wherein the wedged refractive plate element is a wedged plate having a wedge angle α below 1°.

5. The method according to claim 4, wherein the wedged refractive plate element has a wedge angle α below 0.8°.

6. The method according to claim 1, wherein the refractive plate element has a plane or a curved plate surface.

7. The method according to claim 1, wherein the fundamental radiation is p-polarized and the primary radiation beam impinges with an incident angle on the refractive plate element, wherein the incident angle is a Brewster angle with regard to an optical wavelength of the p-polarized fundamental radiation.

8. The method according to claim 7 wherein the enhancement cavity includes a cavity section with two curved mirrors which define a focus position, where the target medium is provided, and wherein the deflection mirror is arranged in the cavity section between one of the two curved mirrors and the focus position.

9. The method according to claim 7, wherein the enhancement cavity includes a cavity section with two curved mirrors which define a focus position, where the target medium is provided, and wherein the deflection mirror is arranged outside the cavity section with the two curved mirrors and the focus position.

10. An enhancement cavity device, comprising:
- a plurality of cavity mirrors spanning a cavity beam path and including two curved cavity mirrors which are adapted for focusing a fundamental radiation component along the cavity beam path at a focus arranged for providing a target medium in the cavity beam path, and
- an optical device adapted for spatially splitting a fundamental radiation a first radiation component including an optical wavelength and a second or higher harmonic radiation having a wavelength shorter than the fundamental radiation wavelength from each other, said optical device comprising:
- a deflection mirror having a reflective mirror surface, and
- a wedged refractive plate element carried on the reflective mirror surface and having an exposed plate surface, said refractive plate element being transmissive for the fundamental radiation and having a refractive effect on the fundamental radiation wherein the wedged refractive plate element has a maximum thickness of at most 50 μm, and wherein
- the optical device is arranged such that the exposed plate surface of the refractive plate element with reference to the fundamental radiation forms a Brewster angle relative to the cavity beam path, and
- the reflective mirror surface is designed for reflecting the fundamental radiation and the refractive plate element is designed for reflecting the second or higher harmonic radiation at the plate surface thereof.

11. The optical device according to claim 10, wherein the wedged refractive plate element has a plane or curved plate surface.

12. The optical device according to claim 10, wherein the wedged refractive plate element has a wedge angle $\alpha$ of at least 0.05°.

13. The optical device according to claim 12, wherein the wedged refractive plate element has a wedge angle $\alpha$ of at least 0.3°.

14. The optical device according to claim 10, wherein the wedged refractive plate element has a wedge angle $\alpha$ below 1°.

15. The optical device according to claim 14, wherein the wedged refractive plate element has a wedge angle $\alpha$ below 0.8°.

16. The optical device according to claim 10, wherein the wedged refractive plate element has a triangular or trapezoidal cross-sectional shape.

* * * * *